Jan. 27, 1948.                J. W. MAGEE                2,434,942
                         CHEMICAL TESTING DEVICE
                         Filed April 24, 1946         4 Sheets-Sheet 1
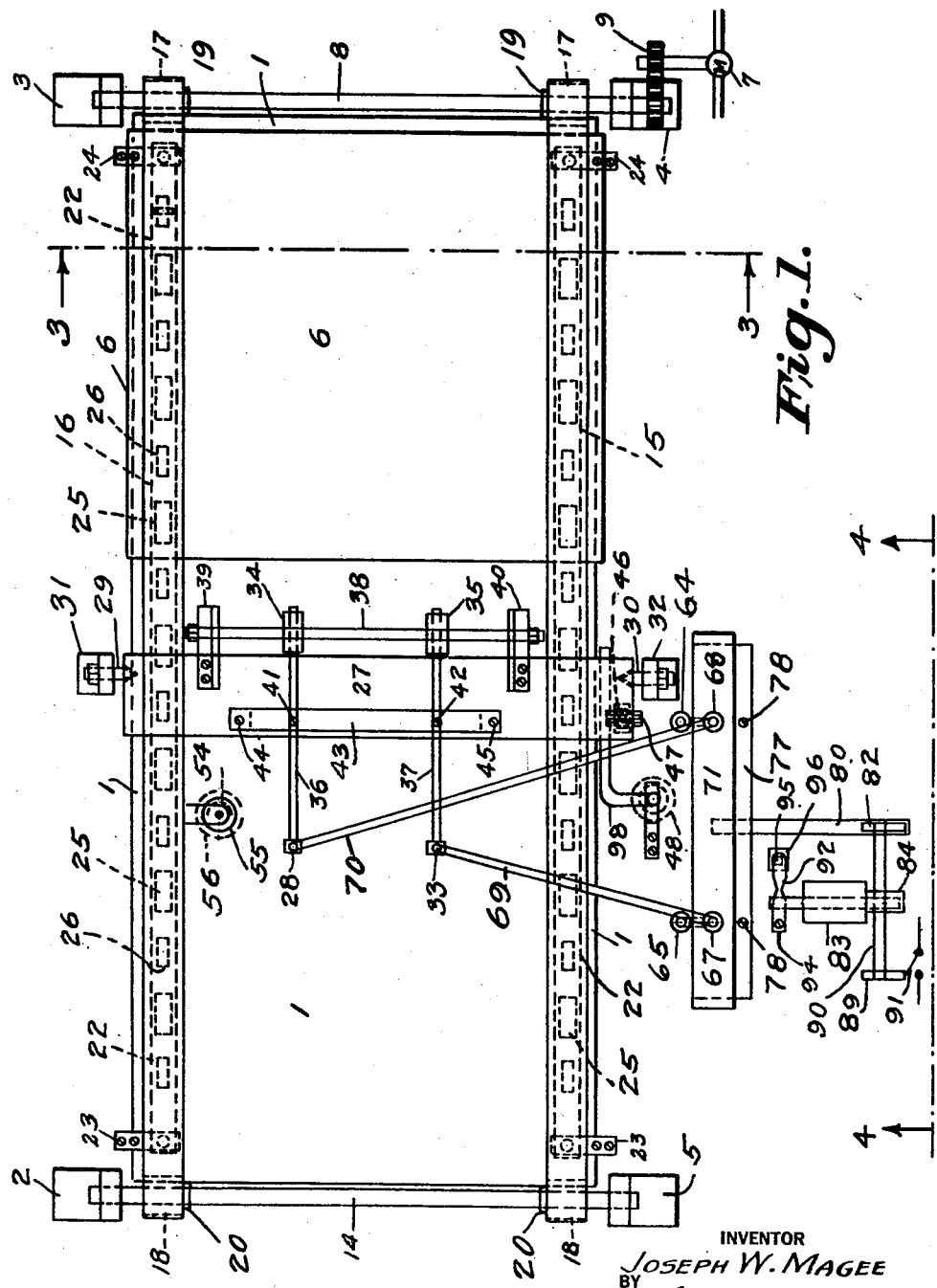
INVENTOR
JOSEPH W. MAGEE
BY
*J. Motherhead*
ATTORNEY Jan. 27, 1948.   J. W. MAGEE   2,434,942
CHEMICAL TESTING DEVICE
Filed April 24, 1946   4 Sheets-Sheet 2
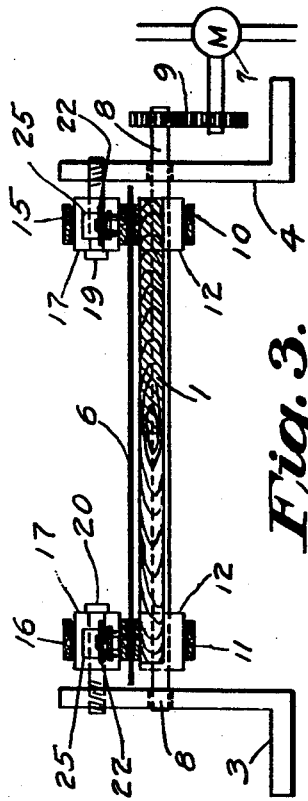
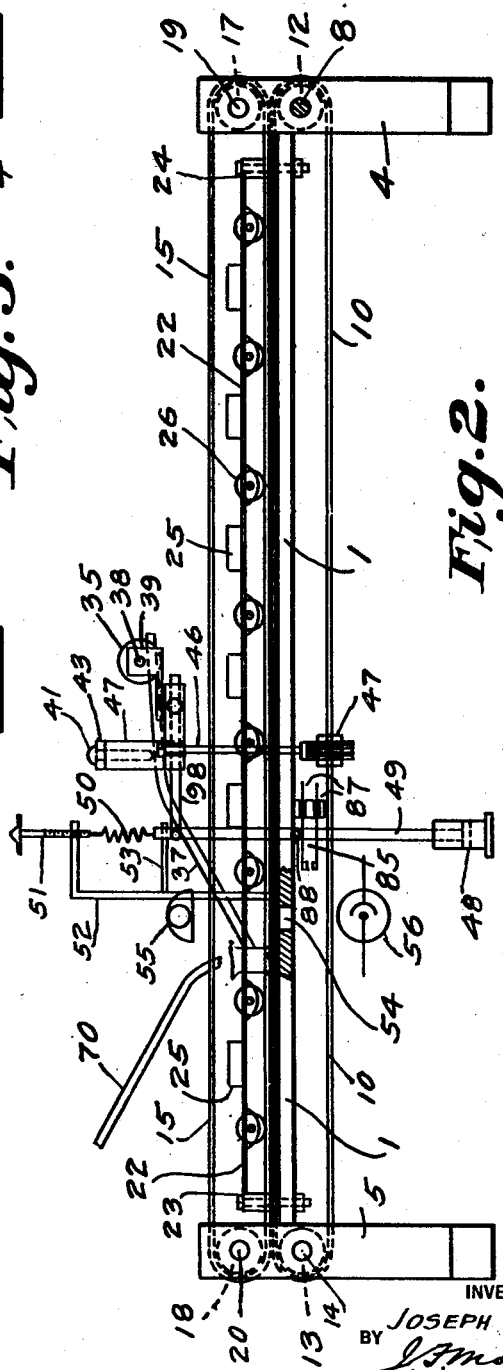
INVENTOR
JOSEPH W. MAGEE
BY
J. F. Motherhead
ATTORNEY Jan. 27, 1948.    J. W. MAGEE    2,434,942
CHEMICAL TESTING DEVICE
Filed April 24, 1946    4 Sheets-Sheet 3
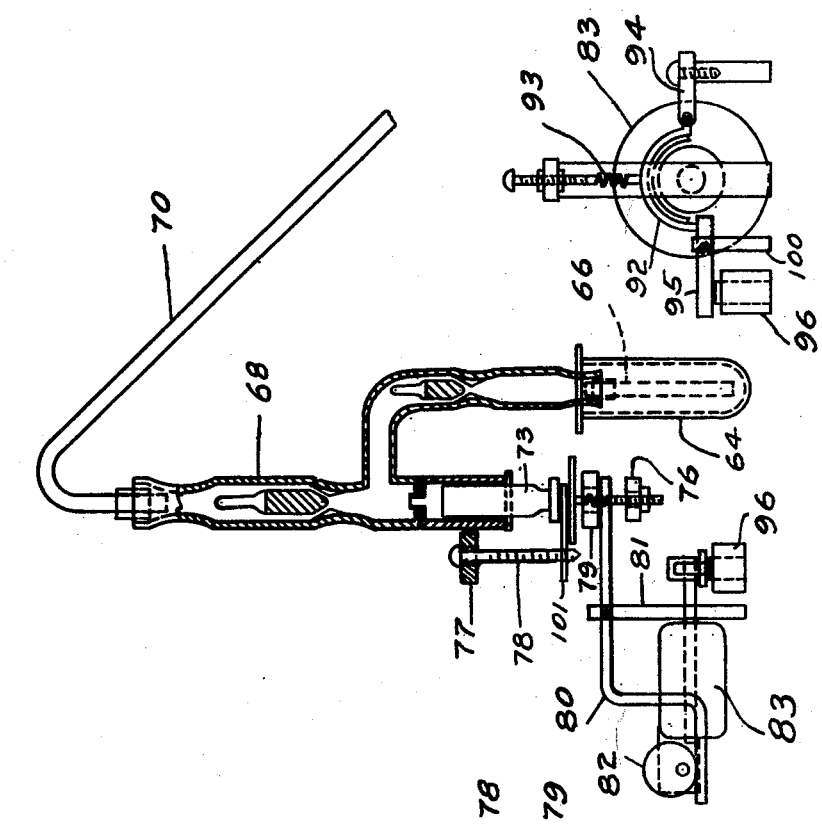
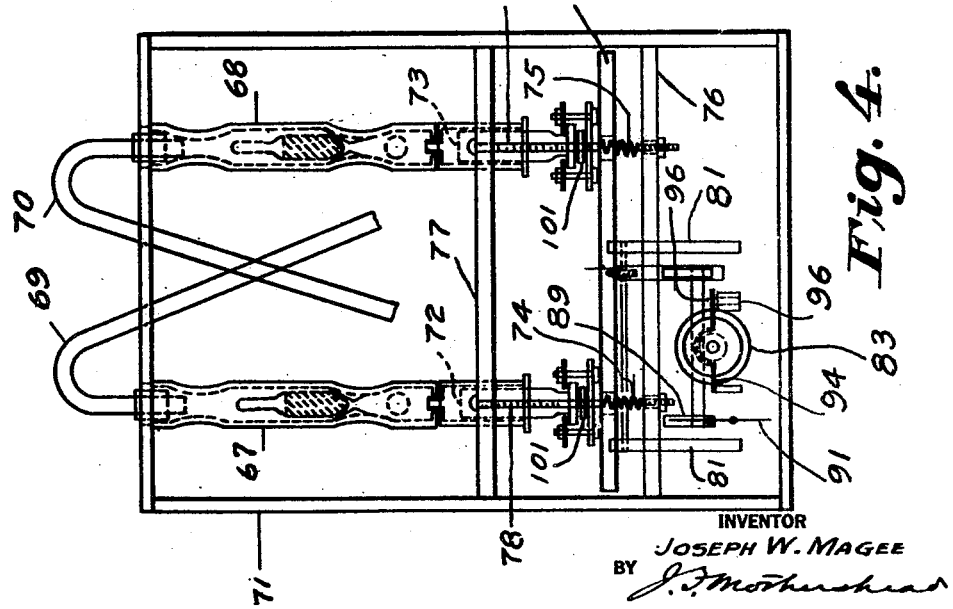
INVENTOR
JOSEPH W. MAGEE
BY
ATTORNEY

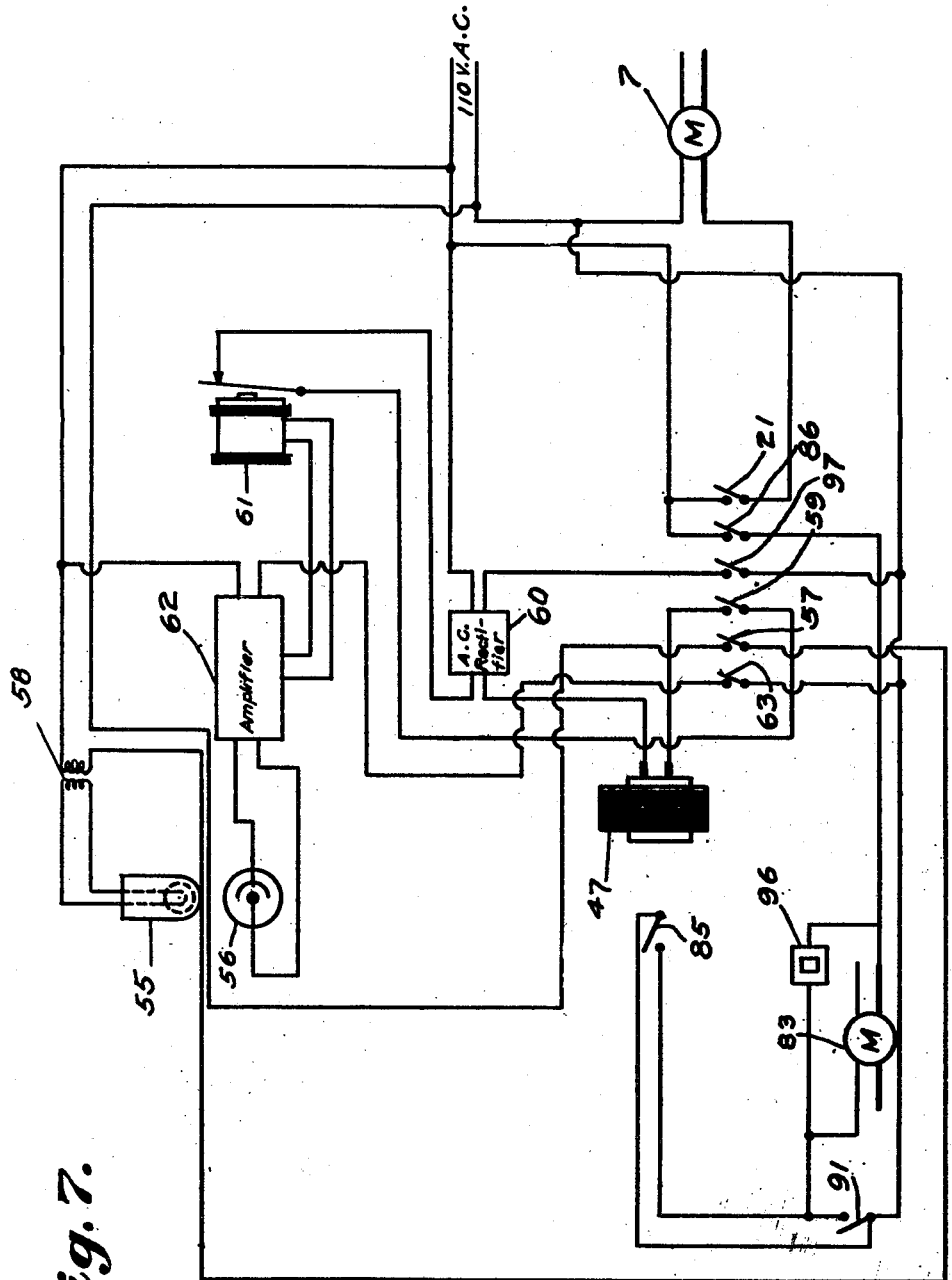

Patented Jan. 27, 1948

2,434,942

UNITED STATES PATENT OFFICE 2,434,942

CHEMICAL TESTING DEVICE

Joseph William Magee, Arlington, Va.

Application April 24, 1946, Serial No. 664,444

3 Claims. (Cl. 91—12)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to a device adapted to test sheet material for secret writing, and somewhat more broadly, to a device for mechanically and automatically applying a plurality of liquid solutions to a sheet, film, foil, or web of material.

In testing sheet material, such as for example correspondence, newspapers and the like, for the presence of messages written in normally invisible ink, it has heretofore been the practice to stripe or paint the document by hand with a plurality of test solutions, each of which is adapted to develop or render visible a certain type or class of normally invisible inks. If any one of the test solutions develops a portion of a message, then the entire document or article is treated with that particular test solution, whereby the normally invisible message is made legible. It can readily be appreciated that, in the censorship of thousands of letters, documents and the like, hand application of the test reagent stripes is a slow, tedious and laborious procedure.

This invention accordingly has for its object the provision of a mechanical device for the application or painting of a plurality of test solution stripes on sheet material to be tested. Another object is the provision of suitable means for automatically applying a predetermined quantity of test solution to each sheet of material processed by the testing device. Other related objects will be apparent or will appear hereinafter as the ensuing description proceeds.

The foregoing objects are accomplished in accordance with this invention which provides a sheet material testing device having a suitable platen adapted to support a test sheet, a plurality of applicators over said platen adapted for movement toward and away from said platen, suitable means including a plurality of adjustable metering pumps for supplying test solutions in controlled amounts to said applicators, a flexible web device for transporting said test sheet over said platen for movement relative to said applicators, and photo-electric means associated with said platen in relation to said applicators for bringing said applicators toward said platen into wiping engagement with said test sheet and simultaneously actuating said metering pumps.

This invention accordingly comprises an automatic device for striping or applying a plurality of solutions to a sheet of material.

This invention will be made clear by reference to the ensuing description and accompanying drawings in which Figure 1 is a plan view, partly diagrammatic, of a suitable device in accordance with this invention;

Figure 2 is an elevation view, partly broken away and partly diagrammatic, of the device of Figure 1;

Figure 3 is a section, partly diagrammatic, along the line 3—3 of Figure 1;

Figure 4 illustrates in somewhat greater detail a suitable metering pump unit and its motor for supplying test solution to an applicator, looking in the direction of the arrows shown on the line 4—4 of Figure 1;

Figure 5 is a view, partly in section and partly diagrammatic, of a metering pump shown in Figure 4;

Figure 6 is a detailed view of the pump brake assembly; and

Figure 7 is a wiring diagram of the electric circuits of the invention.

For a practical embodiment of this invention and referring now to the drawings, a suitable platen 1 (as shown in Figure 1) is provided, and is preferably horizontally supported by legs 2, 3, 4, and 5. The platen 1 is adapted to support a test sheet 6 which may be a sheet of ordinary writing paper.

Suitable means are provided for causing said test sheet or paper 6 to pass across the platen 1 in substantially coplanar relationship thereto. As shown in Figures 1 and 2, such means may take the form of an electric motor 7 actuating a lower shaft 8 through a reduction gear train 9. A pair of lower belts 10 and 11 are positioned on either side of the platen so that their upper surfaces are substantially in the same plane as the upper surface of the platen 1. The lower belts 10 and 11 are driven by lower pulleys 12 keyed to the shaft 8. The opposite ends of the lower belts are carried by a pair of pulleys 13 journaled on a horizontal shaft 14 which is in turn supported by the legs 2 and 5. Frictionally engaging the lower belts 10 and 11 and rotating in a direction counter thereto, are a pair of upper belts 15 and 16. These upper belts 15 and 16 are carried by pulleys 17 and 18 adapted to rotate about a horizontal axis and positioned directly over the lower pulleys 12 and 13. The upper pulleys are supported by suitable stud bolts 19 and 20 as shown in Figure 3. Thus, upon energizing the motor 7 and the lower flexible belts 10 and 11, the upper flexible belts frictionally engage the upper surfaces of lower flexible belts 10 and 11 to form a gripping surface for the test sheet 6 interposed therebetween. As shown in Figure 7, the belt motor 7 is electrically connected through a switch 21 to a suitable source of power which may be 110 volts A. C.

To facilitate the frictional engagement between the upper flexible belts 15 and 16 and the lower flexible belts 10 and 11, there is provided a suitable device for causing a positive frictional connection. Such device may take the form of an extended flexible idler band 22 held inside the upper belts 15 and 16 by overhanging supports 23 and 24 located along the sides of the platen 1. Affixed to the upper surface of the idler bands 22 are a plurality of spaced weights 25 which act by gravity through a plurality of idler wheels 26 carried by the band 22 to cause the upper belts 15 and 16 to bear firmly and continuously against the lower belts 10 and 11 in frictional engagement therewith.

Positioned over the platen 1 are a plurality of applicator devices pivotally mounted about a horizontal axis and adapted for movement toward and away from the platen 1. As shown in Figures 1 and 2, such applicator devices may take the form of a swab holder support 27 horizontally carried by a pair of pivot pins 29 and 30 which are in turn journaled in a pair of supports 31 and 32. A plurality of swabs 28 and 33 are adjustably mounted on the swab holder support 27 at right angles thereto by means of suitable connectors 34 and 35 connecting the swab holders 36 and 37 to a swab pivot shaft 38. The swab pivot shaft 38 is pivotally connected to the swab holder support 27 about an axis parallel to the axis of the support 27 by swab pivot shaft supports 39 and 40. The individual pressures exerted by the swabs 28 and 33 in operation are controlled by set screws 41 and 42 carried by a swab adjuster plate 43 which is in turn rigidly connected to the swab holder support 27 through spacing posts 44 and 45. The swab holder support 27 and the swabs 28 and 33 are adapted to rotate about the pivot pins 29 and 30 through a limited distance to cause the swabs to move toward and away from the platen 1. Pivotally connected to the swab holder support 27 in a manner eccentric to the axis created by the pivot pins 29 and 30 is a swab actuating rod 46 mounted in a substantially vertical position. The lower end of the swab actuating rod 46 is connected to the plunger of a solenoid 47 so that upon electrically actuating the solenoid 47 the swab actuating rod 46 is drawn downwardly to rotate the swab holder support 27 about its pivots. Thus, the swabs 28 and 33 are brought downwardly into engagement with the test sheet 6 passing across the top of the platen 1.

To moderate the violence of the downward action of the solenoid 47, a dash pot 48 is provided as shown in Figure 2, and its vertical piston rod 49 is also connected by the lever 98 to the swab holder support 27. To the upper end of the dashpot piston rod 49 a tension spring 50 is connected to a set screw 51, adapted to adjust the tension on spring 50. The set screw 51 is in turn mounted upon a supporting arm 52. The upward movement of the dashpot piston 49 is caused by the tension spring 50 and is adjustable by the set screw 51. Projecting from the arm 52 is a limiting arm 53 adapted to limit the upward return of the dashpot piston rod 49 and thus to limit the rotary motion of the swabs 28 and 33 away from the platen 1.

Closely adjacent to the lowermost position of the swab 28 is an aperture 54 in the platen 1. The aperture 54 is not directly in line with the travel of the swabs 28 and 33, but is slightly toward the direction from which the test sheets of paper 6 are fed across the platen 1. A light source 55, which may be an ordinary electric light bulb of small size, is directly positioned over the aperture 54 in the platen 1 so that upon traverse of a test sheet across platen 1 the light from the light source 55 cannot pass through the aperture 54. A photoelectric cell 56 is supported directly beneath the aperture 54 so that in the absence of obstruction to the aperture 54, light from the light source 55 passes through the aperture 54 and is received by the photoelectric cell 56. As shown in the schematic wiring diagram of Figure 7, the light source 55 is connected to 110 volts A. C. through a switch 57 and an optional stepdown transformer 58, adapted to reduce the voltage to a desired value for a small electric light bulb. The solenoid 47 for actuating the swabs 28 and 33 may be electrically connected through a switch 59 to an optional rectifier 60 adapted to feed the solenoid 47 with approximately 20 volts of direct current from a suitable source of 110 volts A. C. Interposed in the solenoid 47 electrical circuit is a relay 61 which is in turn energized through an amplifier 62 by the photoelectric cell 56. When the aperture 54 is uncovered, the light from the source 55 passes through the aperture 54 where it develops a very small current in the photoelectric cell 56. This current is amplified by the amplifier 62 (connected in turn through a switch 63 to a suitable source of current) and the relay 61 is thereby held in the open position. However, as soon as the aperture 54 is obstructed by the passage of a test sheet 6, the photoelectric cell 56 is no longer energized and the relay 61 closes its contact which in turn energizes the solenoid 47. When the solenoid 47 is energized, it causes the swabs 28 and 33 to move downwardly into contact with the test sheet 6 passing across the platen 1. The action of the solenoid 47 is moderated in violence by the dash pot 48, and when the test sheet 6 has completely passed by the aperture 54, light from the light source 55 again passes through the aperture 54, again energizing the photocell 56 and disconnecting the relay 61.

In order that the swabs 28 and 33 may be continuously or intermittently fed with replenishing amounts of striping solutions in amounts proportional to the swab requirements, suitable means are provided for delivering metered quantities of individual striping solutions or test reagents, as the case may be, to the swabs 28 and 33. The amounts of striping solution to be delivered to each individual swab depends on the test sheet surface to be covered, the number of test sheets to be striped, the size of the test sheet, and the viscosity or absorption characteristics of the test solution. Furthermore, the test solution must be fed continuously or intermittently in automatic fashion as it is consumed. To these ends, there is provided a plurality of metering pumps which are adjustable as to quantities pumped and automatically controlled by the photoelectric mechanism above described to deliver metered quantities of test solutions to the swabs 28 and 33. As shown in Figures 1, 4, 5, and 6, the pump mechanism comprises a pair of test solution reservoirs 64 and 65 into which dip a pair of tubes 66, shown in Figure 5. The tubes are connected to a pair of pumps 67 and 68 which in turn deliver test solutions through the delivery tubes 69 and 70 to the swabs 28 and 33. The delivery tubes 69 and 70, as well as the pump assembly, are supported by a pump holder 71. The delivery tubes 69 and 70 terminate a short distance directly above the swabs 28 and 33 to allow for normal travel of the swabs 28 and 33 into contact with and away from the test sheet 6 as it passes under the swabs. The pumps 67 and 68 are provided with a pair of pump pistons 72 and 73 which are in turn connected to a pair of tension springs 74 and 75 carried by a pump plunger return spring holder 76, fastened to the pump holder 71. The suction stroke for each pump is caused by the tension spring to which its piston is attached. The length of the suction stroke for each pump is made adjustable by a headed screw 78 mounted on an axis parallel to that of the pump piston 73 and threadedly connected to the pump piston 73 by an arm 101. The shank of the adjuster screw 78 passes loosely through a limiting stop 77 which is in turn horizontally positioned in the holder 71. Thus, by turning the screw 78, the length of the suction stroke of each individual pump piston 72 and 73 can be adjustably limited.

The pressure stroke of each pump is caused by a pump connecting bar 79 horizontally positioned in the pump holder 71 and adapted for arcuate movement upward and downward. The bar 79 is carried by a horizontal lever 80 which is in turn pivotally carried by a support 81. The portion of the lever 80 which is on the opposite side of the support 81 from the pump mechanism is in engagement with a cam 82. The cam 82 is adapted to rotate about a horizontal axis and is connected to a motor 83 through a reduction gear train 84. Upon energizing the motor 83 the cam 82 is caused to rotate, which in turn causes the lever 80 to oscillate about its support 81 and thereby alternately elevates and depresses the pump connecting bar 79. Upon elevation of the pump connecting bar 79 the test liquids in the pumps 67 and 68 are delivered to the swabs 28 and 33 through the tubes 69 and 70. Upon depression of the pump connecting bar 79 the tension springs 74 and 75 withdraw the pump pistons 72 and 73, a distance limited for each pump by its adjusting screw 78. Thus, each pump becomes filled with a metered quantity of test solution for delivery to each swab upon the next cycle of the pump.

The pump motor 83 is connected through a switch 85 (shown on Figures 2 and 7) to a suitable source of electric current. Optionally, an additional safety switch 86 may be interposed in this circuit. The pump motor switch 85 is indirectly actuated by mechanism responsive to the passage of a test sheet 6 through the photocell mechanism above explained, and as shown in Figure 2, the pump actuating mechanism may take the form of a pair of switch contacts 87 adapted to be closed by an arm 88 projecting from the dashpot piston rod 49. Thus, on the downward motion of the dashpot piston rod 49, the arm 88 causes the contacts 87 of switch 85 to close and thus energizes the pump motor 83. Therefore, as long as the swabs 28 and 33 are in wiping engagement with a test sheet 6 and the dashpot piston rod 49 is in the downward position, the switch 85 remains closed and the pump motor 83 operates continuously to deliver metered amounts of test solutions to the swabs 28 and 33. However, it may happen that a test sheet 6 has passed the aperture 54 and as above explained, the swabs 28 and 33 have then taken their upward position away from the platen 1 during an intermediate position of the pump pistons 72 and 73. To cause the pump pistons 72 and 73 to complete their cycle and thus be prepared for an additional test sheet, it is desirable that suitable means be provided for causing the cam 82 to continue turning so that it will always come to rest at a predetermined position relative to the cycle of the pumps 67 and 68. To this end, there is provided a cam 89 connected through a shaft 90 to the reduction gear 84 (the shaft 90 may also serve to actuate the cam 82). A micro-switch 91 is positioned in engagement with the cam 89 and connected in the circuit of the pump motor 83 so that regardless of the position of the switch 85 the pump motor 83 is supplied with electrical current until it has completed a predetermined pump cycle.

In order to prevent the pump motor 83 from coasting of its own inertia substantially beyond the position in which the cam 82 is desired to be at the completion of the pump cycle, there is provided a brake mechanism attached to the pump motor 83. This mechanism, as shown in Figure 6, may take the form of a brake shoe 92 engaging the shaft of the motor 83 and normally held into engagement with the shaft of the motor 83 by a compression spring 93. The brake shoe 92 is pivotally supported at one side by a support 94 and is pivotally connected on the opposite side of the motor shaft to an armature 95 of an electromagnet 96. The electromagnet 96 is connected in the circuit of the pump motor 83 (as shown in Figure 7) in such fashion that whenever the pump motor 83 is energized the electromagnet 95 is also energized. As shown in Figure 6, the armature 95, which is pivotally connected to the brake shoe 92, is fulcrumed upon a support 100 beside the electromagnet 96 in such fashion that when the electromagnet 96 is energized, the portion of the armature 95 away from the brake shoe 92 is drawn toward the electromagnet 96 and the opposite end of the armature 95 urges the brake shoe 92 away from the shaft of the motor 83 and disengages the brake. Thus, when the pump motor 83 is energized, the brake shoe 92 disengages the pump motor 83 and allows it to turn freely, while the brake shoe 92, under the influence of the spring 93, immediately stops the pump motor 83 as soon as the current supply for the pump motor circuit is cut off, simultaneously cutting off the current supply for the electromagnet 96.

In order that the operation of a striping machine in accordance with this invention be fully understood, a typical operating cycle will now be described. The reservoirs 64 and 65 for each pumping unit are first filled with the desired testing reagents or striping fluids, as the case may be. Thereupon, the pump motor is energized by closing its optional switch 57 and by manually closing the switch 85. The pump motor 83 thus causes the cam 82 to revolve through several revolutions and the pumps 67 and 68 deliver test solutions to the swabs 28 and 33 until they are substantially saturated. The belt motor 7 is then energized by closing the belt motor switch 21. Thereupon, the rectifier switch 97, the light source switch 57, and the amplifier switch 63 are closed to energize the corresponding portions of the electrical circuits. At the end of about one minute the amplifier 62 will have warmed up sufficiently so that the relay 61 will be energized and thus open the electrical circuit for the solenoid 47. The solenoid switch 59 is now closed in order that an interruption in the light flowing from the light source 55 to the photoelectric cell 56 will be effective to operate the solenoid 47. A sheet of paper 6, or other sheet material to be tested or striped, is now fed between the cooperating upper and lower belts near the pulleys 12 and 17. The upper belts 15 and 16 grip the test sheet 6 together with the lower belts 10 and 11 along the outer margins of the test sheet. The test sheet 6 is thus transported across the platen 1 in coplanar relationship thereto until the test sheet 6 obstructs the aperture 54 in the platen 1. The test sheet 6 in this position interrupts the flow of light from the light source 55 to the photoelectric cell 56. As soon as the photoelectric cell 56 no longer receives light from the light source 55 the relay 61 is de-energized and permits electric current to flow to the solenoid 47. Thereupon, the solenoid 47 acts upon the swab activating rod 46 to rotate the swab holder support 27 about the pivot pins 29 and 30. As the swab holder support 27 thus rotates, the swab holders 36 and 37 move toward the platen 1 carrying the swabs 28 and 33 into wiping engagement with the test sheet 6 being transported across the platen 1. The pressure of the swabs 28 and 33 upon the test sheet 6 is regulated by suitably adjusting the set screws 41 and 42 carried by the swab adjuster plate 43. By virtue of the swab pivot shaft 38 and the connectors 34 and 35, the swabs 28 and 33 can be moved relative to each other. Since the solenoid 47 tends to operate violently, the violence of the downward motion of the swabs 28 and 33 into wiping engagement, is moderated by the dashpot 48 connected by the dashpot piston rod 49 and the dashpot activating lever 98 mounted on the swab holder 27. As the dashpot piston rod 49 moves downwardly, the projection or arm 88 extending horizontally from the piston rod 49 closes the pump motor switch 85. Thereupon, the pump motor 83 and the electromagnet 96 are energized, the magnetic brake shoe 92 is elevated free of the pump motor shaft, and the pump motor revolves the cam 82 through the reduction gear 84. The pump activating lever 80 then elevates the pump pistons 72 and 73 a uniform height to discharge test or striping solutions from the pumps 67 and 68 through the tubes 69 and 70 to the swabs 28 and 33. As the pump motor continues to rotate, the cam 82 completes a revolution, during which the pump lever 80 acts through the pump connecting bar 79 to lower the pump connecting bar 79 out of engagement with the pump pistons 72 and 73. Thereupon, the pump plunger return springs 74 and 75 individually return the pump pistons 72 and 73 a predetermined distance in a downward direction which is limited for each pump by the adjustment of the flow adjuster screw 78. The head of the flow adjuster screw 78 for each pump abuts against the limiting stop bar 77. Upon the above-described downward or suction strokes of the pump piston 72 and 73, metered quantities of test solution are drawn into the pumps 67 and 68 in preparation for the next pressure strokes of the pumps 67 and 68.

After the test sheet 6 has been transported across the platen 1 and has been striped by the swabs 28 and 33, brought as above described into wiping engagement therewith, the aperture 54 in the platen 1 is uncovered by the trailing edge of the test sheet 6 and light from the light source 55 again passes through the aperture 54 to the photoelectric cell 56. Thereupon, electric current from the photoelectric cell 56 passes into the amplifier 62, is amplified for actuation of the relay 61, and the relay 61 then opens the electric circuit to the solenoid 47. When the solenoid 47 is de-energized, the swab return spring 50 acts through the dashpot lever 98 to rotate the swab holder support 27 about the axis defined by pivot pins 29 and 30 in such fashion that the swabs 28 and 33 are lifted out of wiping engagement with the moving test sheet 6. Simultaneously, the projection or arm 88 on the dashpot piston 49 moves in an upward direction and opens the pump motor switch 85. However, the pumps 67 and 68 may not have completed a pumping cycle at this precise moment. The micro switch 91, actuated by the cam 89, now functions to continue the supply of electric current to the pump motor 83 and the electromagnet 96 until the cam 89 reaches a position indicating a completion of the pump cycle. The position of the cam 89 is initially set in relation to the position of the cam 82 so that the micro switch 91 is open only when the pump cycle has been completed; that is to say, when the position of the pump activating lever 80 is at the completion end of a cycle. Upon completion of a pump cycle, the micro switch 91 is opened by the cam 89 and de-energizes the pump motor 83 and the electromagnet 96. Thereupon, the compression spring 93 forces the brake shoe 92 into frictional engagement with the shaft of the pump motor 83 and immediately terminates further rotation of the pump motor 83. The cycle of the mechanism has now been completed.

It will be seen that the swabs 28 and 33 are brought into wiping engagement with a test sheet 6 whenever the test sheet 6 obstructs the aperture 54. The mechanism is adapted to operate continuously or intermittently whenever a test sheet is fed into the machine. The length of the test sheet is immaterial since the swabs remain in wiping engagement with the test sheet until the test sheet has been completely striped from one end to the other. The transporting mechanism can be made of any suitable width to stripe or test various sizes of sheet material. The pump mechanism, as shown from the foregoing, is completely automatic in operation and is adapted to deliver a predetermined quantity of test solution to each swab, which quantity of test solution is proportioned to the length of the test sheet being striped. For a relatively long test sheet, the metering pump mechanism continuously delivers test solution to the swabs as long as the swabs require a supply of test solution.

It will be evident from the foregoing that there has been provided a very convenient and desirable apparatus for the automatic striping of letters, papers, documents, webs and similar sheet material with a plurality of solutions of different characteristics.

Since many apparently differing embodiments of the invention will occur to one skilled in the art, various changes can be made without departing from the spirit and scope of the invention.

What is claimed is:

1. In a device of the class described, the combination of a stationary platen with means for transporting a test sheet across said platen in coplanar relationship thereto, a plurality of applicators mounted above said platen for movement toward and away from said platen into wiping engagement with said test sheet, solenoid means for causing said applicators to engage said sheet during transport, photoelectric means interrupted by said test sheet for actuating said solenoid means, and means for delivering proportional quantities of test solutions to each applicator with passage of each test sheet.

2. In a device for testing sheet material for secret writing, the combination of a platen adapted to support a test sheet with a plurality of applicators over said platen adapted for movement toward and away from said platen, means for moving said applicators into contact with said test sheet, means including a plurality of pumps for supplying test solutions to said applicators, means for individually adjusting output of each of said pumps, means for driving said pumps, a flexible web device for transporting said test sheet over said platen for movement relative to said applicators, means including a motor for driving said web device, and photoelectric means associated with said platen in relation to said applicators for bringing said applicators toward said platen into wiping engagement with said test sheet and simultaneously actuating said pumps, said photoelectric means comprising a photo-sensitive element and a light source mounted adjacent said platen in such a position that a light beam from said light source to said photo-sensitive element will be interrupted by said test sheet upon movement across said platen, electrical means connected with said photo-sensitive element and said appliactor actuating means for bringing said applicators into contact with said test sheet upon interruption of said light beam, and electrical means connected to said drive means for said pumps adapted to actuate said pump drive upon interruption of said light beam and actuation of said applicators.

3. In a striping device, the combination of conveying means for transporting sheet material with means for driving said conveying means, contact applicator means mounted for movement into and out of wiping engagement with said sheet material, means for moving said applicator means into and out of contact with said sheet material, an output-adjustable pump for delivering liquid to said applicator means, means including an electric motor for driving said pump and a photoelectric circuit associated with said conveying means for simultaneously energizing said pump driving means and said applicator actuating means upon transport of said sheet material, said photoelectric circuit comprising a photosensitive element and a light source mounted adjacent said conveying means in such position that a light beam from said light source to said photo-sensitive element will be interrupted by said sheet material carried by said conveying means, electrical connections with said pump drive means adapted upon interruption of said light beam to actuate said pump drive means and electrical connections with said applicator actuating means and said photo-sensitive element adapted to energize said applicator actuating means upon interruption of said light beam.

JOSEPH W. MAGEE.

REFERENCES CITED

The following references are of record in the file of this patent:

UNITED STATES PATENTS

| Number | Name | Date |
|---|---|---|
| 2,110,052 | Paasche | Mar. 1, 1938 |
| 2,192,833 | Johnson | Mar. 5, 1940 |
| 2,218,811 | Chaussabel | Oct. 22, 1940 |
| 2,243,587 | Turner | May 27, 1941 |
| 2,281,169 | Pattison | Apr. 28, 1942 |